United States Patent Office 3,806,520
Patented Apr. 23, 1974

---

3,806,520
COMPLEXES OF BERYLLIUM HYDRIDE WITH TERTIARY AMINES
Gary Ter Haar, Western Springs, Ill., assignor to Ethyl Corporation, Richmond, Va.
No Drawing. Filed June 5, 1967, Ser. No. 645,562
Int. Cl. C07d 27/04, 87/28
U.S. Cl. 260—326.8                       6 Claims

ABSTRACT OF THE DISCLOSURE

Complexes of beryllium hydride with tertiary amines, containing one molecule of beryllium hydride for each tertiary amino nitrogen atom in the amine, are prepared by reaction of beryllium hydride with an excess of a tertiary amine at a temperature from about 0° C. to 180° C. under the autogenous pressure of the amine.

---

This invention relates to and has as its principal object the provision of a novel method for the preparation of amine complexes of beryllium hydride. The compositions susceptible of preparation by the process of this invention comprise molecular complexes of beryllium hydride with tertiary amines, wherein the molar ratio of beryllium hydride to amine is 1:1 for monoamines and $n$:1 for polyamines containing $n$ tertiary amino nitrogen atoms, and wherein the amine components include trimethylamine, dimethylethylamine, methyldiethylamine, amines of the formula $$Me_2NR$$

wherein Me represents a methyl radical and R a straight-chain alkyl radical containing from three to about twelve carbon atoms, N,N-dimethylbenzyl amine, N,N-dimethylcyclohexyl amine, N-methyl pyrrolidine, N-ethyl pyrrolidine, N-methyl piperidine, N-methyl morpholine, N,N,N',N' - tetramethylethylenediamine, triethylenediamine and tripropylenediamine.

More specifically, the process of this invention comprises preparing the amine complexes disclosed above and/or beryllium hydride complexes of other amines by reacting beryllium hydride with an excess of the corresponding amine at a temperature of from about 0° C. to about 180° C. under the autogenous pressure of the amine to produce a reaction product containing the desired molecular complex and excess amine, and separating the complex from the reaction product. This process is an important embodiment of the present invention. Other embodiments will appear hereinafter.

The process of the present invention exhibits a significant advantage over previously published methods for the preparation of beryllium hydride. Thus, the amine complexes disclosed above represent the only known soluble form of beryllium hydride which can readily be dissociated to yield the free hydride. The present process can therefore be used to prepare pure beryllium hydride from the impure products of previously published methods of separation or from reject material. This can be accomplished by converting the impure beryllium hydride to an amine complex using the process of this invention, purifying the complex by crystallization or other suitable method, and dissociating the complex thermally to beryllium hydride.

The invention will be more fully understood by reference to the following set of illustrative examples in which, unless otherwise specified, all parts and percentages are by weight.

EXAMPLE 1

Beryllium hydride trimethylamine

A Monel metal bomb was fitted with a valve, the screw threads of which were sealed with strip Teflon (polytetrafluoroethylene). One part of beryllium hydride was placed in the bomb, after which the valve was attached and tightened. About 54 parts of trimethylamine were condensed into the bomb, which was then placed in an oil bath at 140° C. and rotated continuously at that temperature for ten days.

The bomb was removed from the oil bath, cooled with liquid nitrogen to −196° C. and opened under vacuum. Only a trace of noncondensible gas (hydrogen) was found to have been liberated. The excess trimethylamine was pumped out at −60° C. The bomb was then opened under an atmosphere of dry nitrogen, and 5.9 parts of solid product were obtained.

Analysis of the solid product for active hydrogen gave a value of 3.04 percent by weight (theory for beryllium hydride trimethylamine: 2.86). An X-ray pattern indicated that the product was largely crystalline. Crystals removed manually from the solid product gave an active hydrogen value of 2.80, indicating a high degree of purity.

An experiment similar to the above, except that 3.3 parts of beryllium hydride were used, the temperature of reaction was 135° C. and the reaction time four days, gave a 93 percent yield of a product having an active hydrogen content of 2.87 percent by weight corresponding, within the limits of analytical error, to a purity of 100 percent.

EXAMPLE 2

Beryllium hydride N-methyl pyrrolidine

Using the method of Example 1, 2.82 parts of beryllium hydride were heated with 131 parts (400 percent excess) of N-methyl pyrrolidine for four days at 145–150° C. A 75-percent yield of product was obtained which evolved, upon acid treatment, 20.5 millimoles of hydrogen per gram (theory for the 1:1 molecular complex: 20.8).

The product has a melting point of 86.0 to 86.5 C. Its molecular weight in benzene (by freezing point depression) was 192, corresponding to the dimer.

When the N-methyl pyrrolidine of Example 2 was replaced by N-ethyl pyrrolidine, dimethyl-n-dodecyl amine, dimethyl-n-octyl amine and N-methyl piperidine, the corresponding molecular complexes were obtained.

When the N-methyl pyrrolidine of Example 2 was replaced by N,N,N',N'-tetramethylethylene diamine, similar results were obtained, but the product was polymeric in nature.

EXAMPLE 3

Beryllium hydride N,N-dimethylbenzyl amine

Using the method of Example 1, 1.33 parts of beryllium hydride were heated with 16 parts (approximate stoichiometric equivalent) of N,N-dimethylbenzyl amine for five days at 130–160° C.

Since the product adhere to the wall of the bomb, it was extracted with 80 parts of hot N,N-dimethylbenzyl amine. The extract was filtered hot and cooled to ambient temperature, whereupon 7.21 parts of product separated out.

The product had a melting point of 101–103° C. Upon acid treatment, it evolved 13.01 millimoles of hydrogen per gram (theory for the 1:1 molecular complex is 13.7).

A considerable variety of amine reactants can be employed in the process of this invention. These include, in addition to those mentioned above, N,N-dimethylethyl amine;
N-methyldiethyl amine;
N,N-dimethylisobutyl amine;
N,N-dimethyl-n-hexyl amine;
N,N-dimethyl-n-decyl amine;
N,N-dimethylcyclohexyl amine;
N,N-dimethyl-4-ethylcyclohexyl amine;
N,N-dimethyl-3,5-dimethylcyclohexyl amine;
N,N-dimethyl-3,5-diethylcyclohexyl amine;
N,N-dimethyl-4-ethylbenzyl amine;
N,N-dimethyl-3-isobutylbenzyl amine;
N,N-dimethyl-4-tert-butylbenzyl amine;
N,N-dimethyl-3-n-octylbenzyl amine;
N,N-dimethyl-2-n-decylbenzyl amine;
N,N-dimethyl-4-n-dodecylbenzyl amine;
N,N,N',N'-tetramethyl propylene diamine; and
N,N,N',N'-tetramethyl butylene diamine.

In the process of this invention, the stoichiometry is not critical and the proportions can vary from a 100 percent or greater excess of the beryllium hydride to a 100 percent or greater excess of the amine reactant. However, a moderate excess, say from 10 up to about 60 percent, of the amine is preferred, both because it is the cheaper of the reactants and because the excess amine can serve as reaction solvent.

The order of addition of the reactants is unimportant, both the addition of the amine to the beryllium hydride and the addition of the beryllium hydride to the amine yielding satisfactory results. However, because of the ease of introducing the amine in the gaseous or liquid state into the reactor already containing the solid beryllium hydride, this order of procedure is preferred. The reaction temperature can range fom about 0° C. to 180° C. or above. Temperatures in the range of 130–150° C. are preferred because of the convenience and controllability of the reaction rate at these temperatures. The pressure is the autogenous pressure of the amine at the reaction temperature.

The amine complexes produced by the process of this invention are useful in metal plating of substrates, in the preparation of pure metallic beryllium and as reducing agents for such organic compounds as acids, esters, nitriles, ketones, aldehydes and olefins. Furthermore, they can be pyrolyzed under suitably controlled conditions to beryllium hydride, which is itself useful as a source of storable hydrogen, as a medium for the metal plating of substrates, as a source by thermal decomposition of pure metallic beryllium, and as a component of jet and rocket fuels.

I claim:
1. Process for the preparation of a molecular complex of beryllium hydride with a tertiary amine, wherein the molar ratio of beryllium hydride to amine is $n$:1 where $n$ is the number of tertiary amino nitrogen atoms contained in the amine, and wherein the amine is selected from the group consisting of trimethylamine, dimethylethylamine, methyldiethylamine, N,N-dimethyl isobutylamine, amines of the formula

$Me_2NR$ wherein Me represents a methyl radical and R is a straight-chain alkyl radical containing from three to about twelve carbon atoms, N,N-dimethylbenzyl amine, N,N-dimethyl-4-ethylbenzyl amine, N,N-dimethyl-3-isobutylbenzyl amine, N,N-dimethyl-4-tert-butyl-benzyl amine, N,N-dimethyl-3-n-octylbenzyl amine; N,N-dimethyl-2-n-decylbenzyl amine, N,N - dimethyl - 4 - n - dodecylbenzyl amine, N,N-dimethylcyclohexyl amine, N,N-dimethyl-3,5-diethylcyclohexyl amine, N-methyl pyrrolidine, N-ethyl pyrrolidine, N-methyl piperidine, N-methyl morpholine, and N,N,N',N'-tetramethylethylene diamine, which process comprises reacting beryllium hydride with an excess of the corresponding amine at a temperature of from about 0° C. to about 180° C. under the autogenous pressure of the amine to produce a reaction product containing said molecular complex and excess amine, and separating said molecular complex from said reaction product.

2. The process of claim 1 wherein said amine is trimethylamine.

3. The process of claim 1 wherein said amine is selected from the group consisting of amines of the formula $Me_2NR$ wherein Me represents a methyl radical and R a straight-chain alkyl radical containing from three to about twelve carbon atoms.

4. The process of claim 1 wherein said amine is N-methyl pyrrolidine.

5. The process of claim 1 wherein said amine is N,N-dimethylbenzyl amine.

6. The process of claim 1 wherein the reaction is performed in a sealed bomb and the reaction temperature is at least about 130° C.

References Cited

Coates et al., J. Chem. Soc. (London), 1954, pp. 2526–2529.

Wood et al., J. Electrochem. Soc., vol. 104, pp. 29–37 (1957).

LELAND A. SEBASTIAN, Primary Examiner

U.S. Cl. X.R.

149—109; 260—247, 293.51, 563 R, 570.5 R, 583 R, 583 P